(12) United States Patent
Shimozono

(10) Patent No.: US 9,193,401 B2
(45) Date of Patent: Nov. 24, 2015

(54) RUBBER CRAWLER

(75) Inventor: Nobuo Shimozono, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 302 days.

(21) Appl. No.: 13/392,332

(22) PCT Filed: Aug. 25, 2010

(86) PCT No.: PCT/JP2010/064348
§ 371 (c)(1),
(2), (4) Date: Feb. 24, 2012

(87) PCT Pub. No.: WO2011/024841
PCT Pub. Date: Mar. 3, 2011

(65) Prior Publication Data
US 2012/0146401 A1   Jun. 14, 2012

(30) Foreign Application Priority Data
Aug. 27, 2009  (JP) ................. 2009-196311

(51) Int. Cl.
*B62D 55/26* (2006.01)
*B62D 55/24* (2006.01)

(52) U.S. Cl.
CPC .............. *B62D 55/26* (2013.01); *B62D 55/244* (2013.01)

(58) Field of Classification Search
CPC .... B62D 55/24; B62D 55/244; B62D 55/253; B62D 55/26
USPC ......... 305/157, 165, 166, 167, 169, 170, 171, 305/172, 173, 174, 176, 177
See application file for complete search history.

(56) References Cited

U.S. PATENT DOCUMENTS

| | | | | |
|---|---|---|---|---|
| 5,984,438 A | * | 11/1999 | Tsunoda et al. | 305/169 |
| 6,106,083 A | * | 8/2000 | Ono | 305/171 |

(Continued)

FOREIGN PATENT DOCUMENTS

| | | |
|---|---|---|
| JP | 3-248974 A | 11/1991 |
| JP | 2000-72056 A | 3/2000 |

(Continued)

OTHER PUBLICATIONS

International Search Report for PCT/JP2010/064348 dated Nov. 9, 2010.

*Primary Examiner* — Kip T Kotter
*Assistant Examiner* — Jean Charleston
(74) *Attorney, Agent, or Firm* — Sughrue Mion, PLLC

(57) ABSTRACT

The object of the present invention is to provide a rubber crawler having reduced vibration during running and further good soil-grasping property and soil-discharging property as well as improved durability. The rubber crawler 1 has a crawler body 10 and a plurality of metal cores 30 buried in the crawler body and lugs 15 provided on an outer periphery side with they being divided into left and right sides across the central portion, the lugs divided into left and right sides being arranged in zigzag alignment with shifting of phase in a circumferential direction of the crawler body, wherein each of the lugs 15 is in the form of trapezoid in section view having a contact area 20, a front side inclined surface 18 and a rear side inclined surface 19, extends from the central portion with inclining in the circumferential direction with respect to the width direction, and has a constriction portion 26 narrowing in the circumferential direction which is provided in the central portion in the width direction with being arranged astride three adjacent metal cores 30 in the circumferential direction in planar view.

10 Claims, 8 Drawing Sheets

(56) References Cited

U.S. PATENT DOCUMENTS

| | | | |
|---|---|---|---|
| 7,740,326 B2* | 6/2010 | Matsuo et al. | 305/178 |
| 2002/0024256 A1* | 2/2002 | Hori et al. | 305/178 |
| 2009/0309415 A1* | 12/2009 | Shimozono | 305/177 |
| 2010/0033010 A1* | 2/2010 | Shimozono | 305/169 |

FOREIGN PATENT DOCUMENTS

| | | |
|---|---|---|
| JP | 2000-313370 A | 11/2000 |
| JP | 2003-89366 A | 3/2003 |

* cited by examiner

RUBBER CRAWLER

CROSS REFERENCE TO RELATED APPLICATIONS

This application is a National Stage of International Application No. PCT/JP2010/064348 filed Aug. 25, 2010, claiming priority based on Japanese Patent Application No. 2009-196311 filed Aug. 27, 2009, the contents of all of which are incorporated herein by reference in their entirety.

FIELD OF THE INVENTION

The present invention relates to a rubber crawler which comprises an endless band-shaped crawler body comprising an elastic material, and metal cores buried in the crawler body at predetermined intervals in the circumferential direction, each of the metal cores extending in the width direction.

DESCRIPTION OF THE RELATED ART

Recently, a rubber crawler is used widely in traveling sections of service vehicles for operating machines of building or construction, or for agricultural machines. The rubber crawler is provided with an endless band-shaped crawler body comprising an elastic material, and metal cores buried in the crawler body at predetermined intervals in the circumferential direction, holes for engaging with a drive wheel which are formed by a sprocket and which are provided between the metal cores adjacently provided at a central portion in a width direction of the crawler body, and a plurality of lugs provided in a protruding condition on the outer periphery side corresponding to a contact area. The rubber crawler is wound around a driving wheel, an idling wheel, and track rollers between the driving wheel and idling wheel, the driving wheel and idling wheel being provided on one and the other end of a crawler frame of a service vehicle.

The rubber crawler requires control of vibration generated in running and durability of the rubber crawler body. In order to deal with these requirements, Patent Document 1 discloses a rubber crawler having lugs provided on an outer periphery side of the crawler body with they being divided into left and right sides, the lugs divided being arranged in zigzag and being arranged astride three adjacent metal cores.

An outline of the rubber crawler 100 disclosed in Patent Document 1 is explained with reference to FIG. 7 and FIG. 8. FIG. 7 shows a plan view of a major part of the rubber crawler 101 viewed from the outer periphery side of the rubber crawler. FIG. 8 shows a section view obtained by viewing FIG. 7 from VI-VI line. An arrow F represents the circumferential direction of the rubber crawler 100 and an arrow W represents the width direction.

In this rubber crawler 100, metal cores 120 extending in a width direction at predetermined intervals with respect to a circumferential direction are buried in an endless band-shaped crawler body 101 comprising an elastic material, a plurality of circumferential direction tensile bodies 130 formed from steel code or the like on an outer periphery of the metal cores 120 are buried along the circumferential direction, holes 102 for engaging with a drive wheel made of a sprocket wheel are provided at an approximately central portion in the width direction of the crawler body 101 and between the adjacent metal cores 120 at predetermined intervals, and the lugs 105 and concave portions 110 in the form of groove are alternatively and integrally formed on the outer periphery side in the circumferential direction.

Each of the metal cores 120 buried in the crawler body 101 is provided with a core metal body portion 121 which is buried in the crawler body 101 and extended in the width direction, and the core metal body 121 has a central portion 122 which engage with a drive wheel and right and left blade portions 123 which protrude in the width direction from both sides of the central portion 122. A pair of guide protrusions 125 protruded on an inner periphery side of the crawler body 101 is provided on the both sides of the core metal body portion 121 across the central portion 122, and the top surface 125a forms a pass surface of track rollers.

The lugs 105 provided on the outer periphery of the crawler body 101 are divided into both sides of the crawler body 101 after the removal of the central portion where the holes 102 for engaging (with a drive wheel) are lined with, and simultaneously arranged in zigzag alignment with phase shift in the circumferential direction of the crawler body 101. Each of the lugs 105 is in the form of trapezoid in section view having a contact area 106, a front side inclined surface 107 and a rear side inclined surface 108, the contact area 106 corresponding to a tread which extends with inclining in the circumferential direction with respect to the width direction, and the lug has such a dimension that it can be arranged astride three adjacent metal cores 120 in the circumferential direction in planar view. A concave portion 110 in the form of groove is formed between these adjacent lugs 105, the concave face being composed of a front side inclined surface 107 and a rear side inclined surface 108 of the adjacent lugs 105 and a bottom surface 109.

PRIOR ART DOCUMENTS

List of Patent Documents

Patent Document 1: JP2000-72056 A

DISCLOSURE OF THE INVENTION

Problem to be Solved by the Invention

According to Patent Document 1, the contact surfaces 106 of the lugs 105, which lie adjacent to each other in the circumferential direction, continuously connect to ground in seamless manners in running, and hence the variation of vertical spring characteristics in the circumferential direction of the crawler body 101 is reduced, which ensures the supporting (bearing) force of the metal cores 120 to suppress the vibration of the metal cores 120.

However, each of the lugs 105, which are arranged astride three adjacent metal cores 120, has large stiffness to bring about excessive vertical spring characteristics to occasionally cause vibration. Further increase of stiffness of each of the lugs 105 brings about increase of stiffness of the crawler body 101, and hence the crawler body 101 cannot be smoothly rounded (bent) around drive wheels, which increases travel resistance and power loss of drive system to cause deterioration of travelling performance and fuel coast (mileage). Furthermore, the increased stiffness causes peeling of the crawler body 101 from the metal cores 120 or crack of the crawler body 101. Still, elastic deformation of the lug 105 is suppressed in running and simultaneously the concave portion 110 formed in the form of groove between the adjacent lugs is narrowed, whereby soil-grasping property and soil-discharging property of the concave portion 110 are reduced to possibly have an influence on traction force and straight-ahead driving property.

Thus, in view of the above-mentioned problems, the object of the present invention is to provide a rubber crawler having reduction of vibration generated by running and of travel resistance, and simultaneously good soil-grasping property and soil-discharging property of the crawler body, and further improved durability.

Means for Solving Problem

The present invention described in claim 1 to achieve the object can be provided by a rubber crawler comprising;

an endless band-shaped crawler body comprising an elastic material, a plurality of metal cores buried in the crawler body at predetermined intervals in a circumferential direction of the crawler body, each of the metal cores extending in a width direction of the crawler body, holes for engaging with a drive wheel provided at a central portion in the width direction of the crawler body and at predetermined intervals in the circumferential direction of the crawler body, and lugs provided on an outer periphery side of the crawler body, the lugs being divided into left and right sides across the central portion in the width direction, and the lugs divided into left and right sides being arranged in zigzag alignment with phase shift in the circumferential direction of the crawler body, wherein each of the lugs is in the shape of a trapezoid in section view having a contact area, a front side inclined surface and a rear side inclined surface, and extends from the central portion with inclining in the circumferential direction with respect to the width direction, and each of the lugs is arranged astride (i.e., across) three adjacent metal cores in the circumferential direction in planar view, and simultaneously has a constriction portion narrowing in the circumferential direction which is provided at the central portion in the width direction.

According to the above-mentioned invention, the constriction portion is provided at the central portion in the width direction of each of the lugs, and hence the bending (rounding) stiffness of the rug is set to be low at the central portion in the width direction. The reduction of the bending (rounding) stiffness brings about the reduction of the stiffness of the crawler body in the entire circumference in the circumferential direction, and hence the crawler body smoothly can be rounded (bent) around drive wheels, which reduces travel resistance and highly reduces power loss to bring about enhancement of travelling performance and fuel coast (mileage). Further, since the constriction portion is formed at the central portion in the width direction of each of the lugs, the stiffness of the lug reduces to tolerate the deformation, and simultaneously since the distance between the front side inclined surface and the rear side inclined surface of the adjacent lugs is sufficiently ensured, the concave portion in the form of groove formed between the adjacent lugs can be formed in a large size, whereby soil-grasping property and soil-discharging property of the crawler are ensured.

In the preferred embodiment of the rubber crawler described in claim 2, which has the constitution of claim 1, wherein the constriction portion is formed such that a length in the circumferential direction at the central portion in the width direction of the contact area of each of the lugs is smaller than that in the circumferential direction at a central side of the contact area and that in the circumferential direction at an edge side of the contact area.

The invention described in claim 2 shows an example of the constriction portion of claim 1. In more detail, the constriction portion is formed by making a length in the circumferential direction at the width-direction central portion of the contact area of the lug smaller than that in the circumferential direction at a central side of the contact area and that in the circumferential direction at an edge side of the contact area.

In the preferred embodiment of the rubber crawler described in claim 3, which has the constitution of claim 1 or 2, wherein the constriction portion is formed by a concave face formed at the central portion in the width direction of the front side inclined surface of each of the lugs.

The invention indicates that the constriction portion can be formed by a concave face formed at the central portion in the width direction of the front side inclined surface of the lug.

In the preferred embodiment of the rubber crawler described in claim 4, which has the constitution of claim 1 or 2, wherein the constriction portion is formed by a concave face formed at the central portion in the width direction of the front side inclined surface of each of the lugs and a concave face formed at the central portion in the width direction of the rear side inclined surface of each of the lugs.

The invention indicates that the constriction portion can be formed by a concave face formed at the central portion in the width direction of the front side inclined surface side of the lug and a concave face formed at the central portion in the width direction of the rear side inclined surface of the lug.

In the preferred embodiment of the rubber crawler described in claim 5, which has the constitution of claim 1 or 2, wherein the constriction portion is formed by a concave face formed at the central portion in the width direction of the rear side inclined surface of each of the lugs.

The invention indicates that the constriction portion can be formed by a concave face formed at the central portion in the width direction of the rear side inclined surface of the lug.

In the preferred embodiment of the rubber crawler described in claim 6, which has the constitution of any of claims 1-5, wherein each of the lugs covers at least a part of a tip of one of the metal cores in planar view.

According to the invention, peeling or crack of the crawler body in the tips of the core metals can be prevented, which brings about the durability of the crawler body containing the lugs.

Effect of the Invention

The rubber crawler of the present invention is provided with the lugs which is in the form of trapezoid in section view having a contact area, a front side inclined surface and a rear side inclined surface, and extends from the central portion with inclining in the circumferential direction with respect to the width direction with being arranged astride three adjacent metal cores in the circumferential direction in planar view, and which has a constriction portion provided at the central portion in the width direction, whereby bending (rounding) stiffness of the lugs is set to be low at the central portion in the width direction. The reduction of the bending (rounding) stiffness brings about the reduction of the stiffness of the crawler body in the entire circumference in the circumferential direction, and hence the crawler body smoothly can be rounded (bent) around drive wheels, which reduces travel resistance and highly reduces power loss to cause enhancement of travelling performance and fuel coast (mileage). Further, since the constriction portion is formed at the central portion in the width direction of each of the lugs and hence the distance between the front side inclined surface and the rear side inclined surface of the adjacent lugs is sufficiently ensured, the concave portion in the form of groove between the adjacent lugs is formed in a large size, whereby soil-grasping property and soil-discharging property of the concave can be ensured.

MODE CARRYING OUT THE INVENTION

Figure 1:
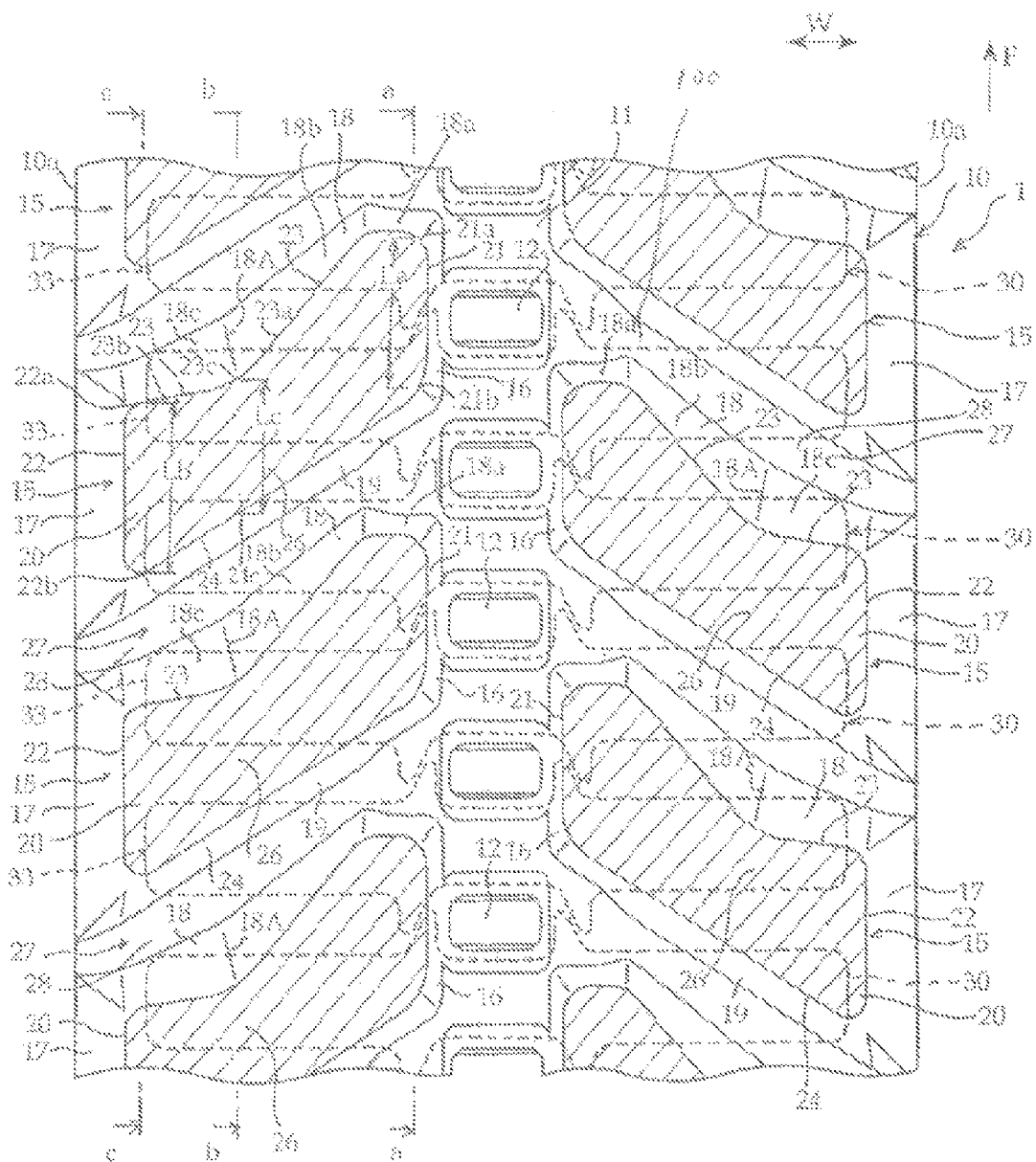
FIG. 1 is a plan view showing a major part of the rubber crawler according to a first embodiment of the present invention viewed from an outer periphery side of the rubber crawler.
Figure 2:
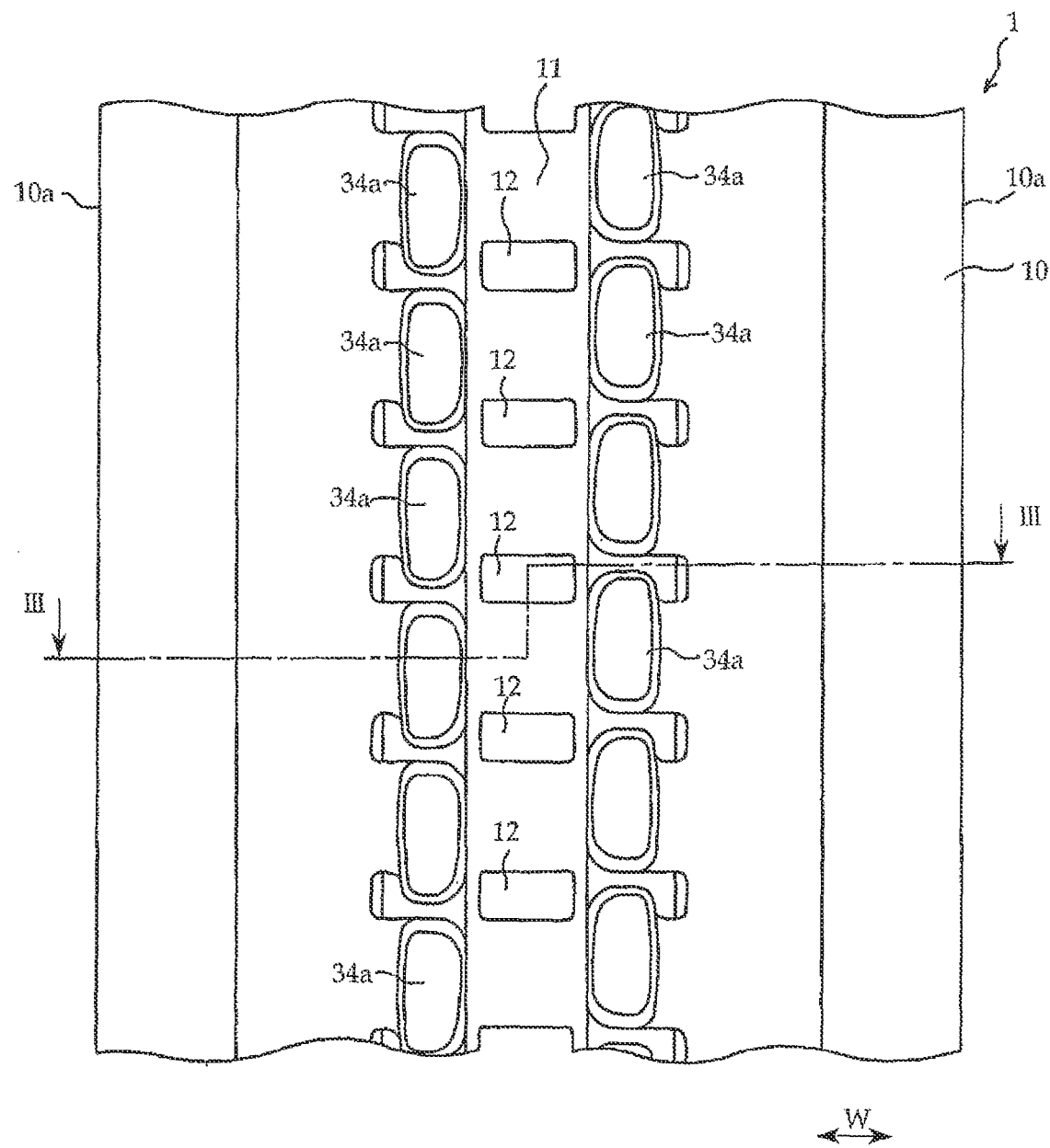
FIG. 2 is a plan view showing a major part of the rubber crawler viewed from an inner periphery side of the rubber crawler.
Figure 3:
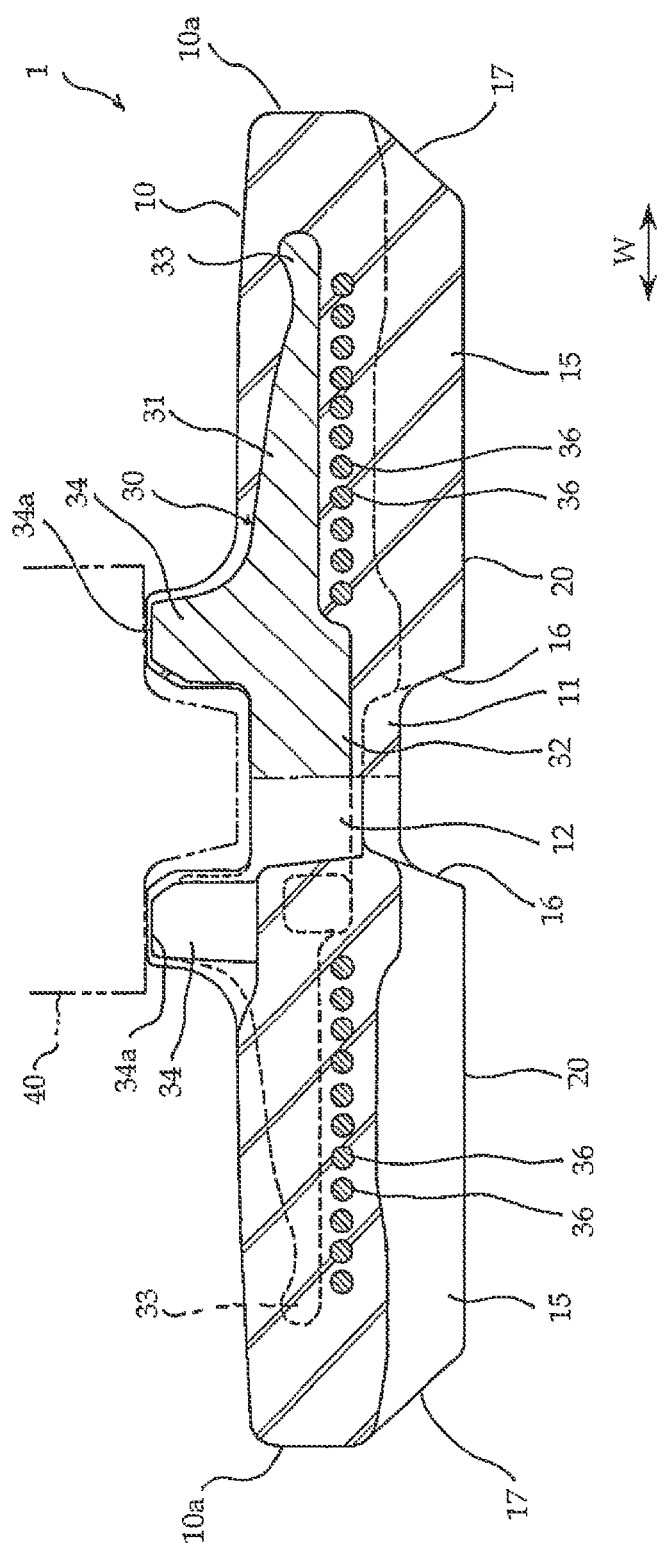
FIG. 3 is a section view of FIG. 2 taken at the section line III-III.
Figure 4:
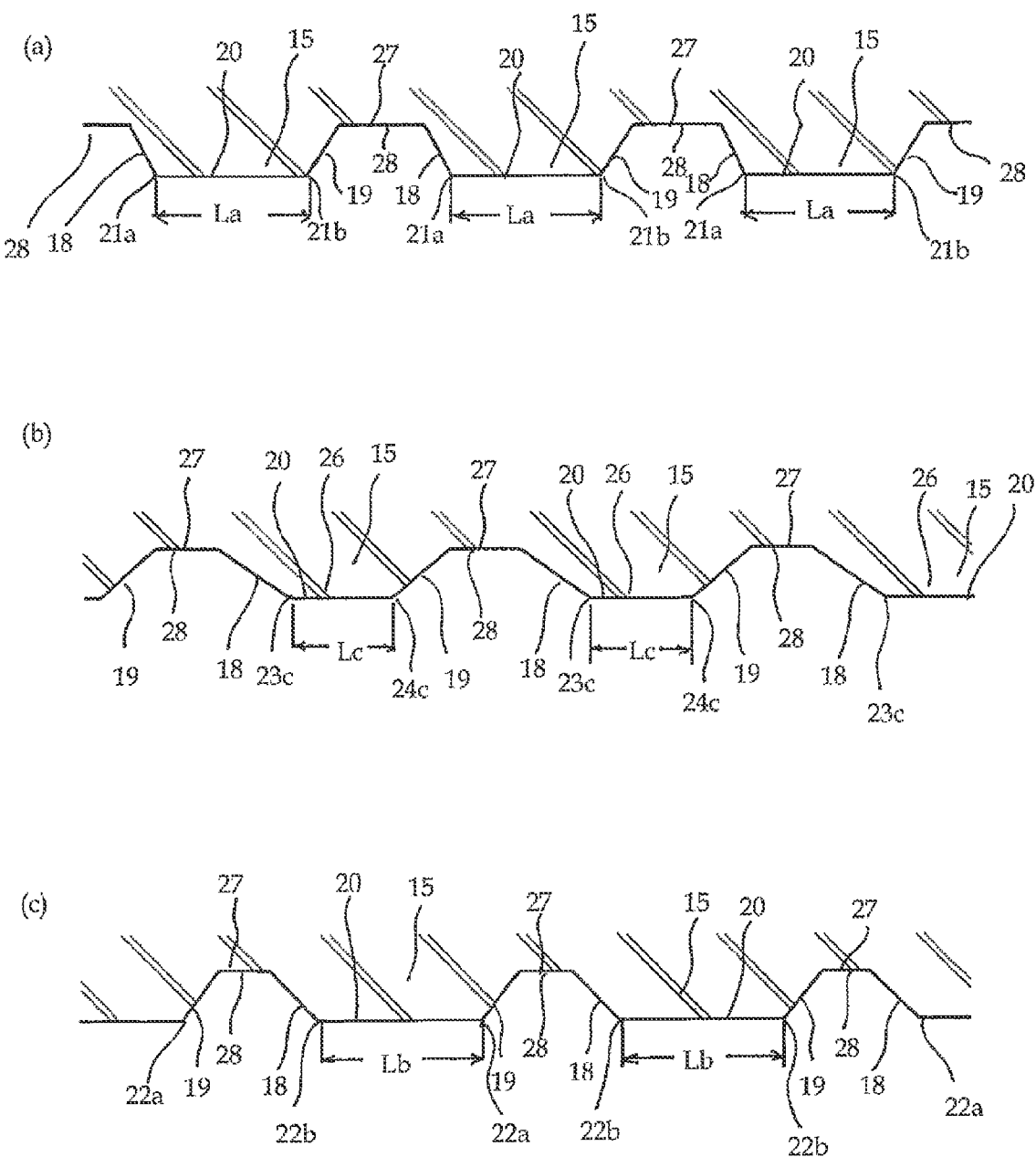
FIG. 4(a) is a section view of FIG. 1 taken at the section line a-a, FIG. 4(b) a section view of FIG. 1 taken at the section line b-b, and FIG. 4(c) a section view of FIG. 1 taken at the section line c-c.

The present invention is explained below with reference to the embodiments of the rubber crawler.
(First Embodiment)
A first embodiment of the rubber crawler is explained below with reference to FIGS. 1 to 4. FIG. 1 is a plan view showing a major part of the rubber crawler according to the present invention viewed from the outer periphery side, FIG. 2 is a plan view showing a major part of the rubber crawler viewed from the inner periphery side, FIG. 3 is a section view of FIG. 2 taken at the section line III-III, FIG. 4(a) is a section view of FIG. 1 taken at the section line a-a, FIG. 4(b) a section view of FIG. 1 at the section line b-b, and FIG. 4(c) a section view of FIG. 1 at the section line c-c. In the figures, an arrow F represents a circumferential direction of the rubber crawler 1, and an arrow W represents a width direction of the rubber crawler 1. The circumferential direction represents the same direction as a front-rear direction, and the width direction represents the same direction as a right and left direction, in the following explanation.

In a rubber crawler 1, a plurality of metal cores 30 are buried in an endless band-shaped crawler body 10 comprising an elastic material at predetermined intervals in a circumferential direction of the crawler body, each of the metal cores 30 extending in a width direction of the crawler body, a plurality of circumferential-direction tensile bodies 36 made of steel cord or the like in the outer periphery side of metal cores 30 are buried in the circumferential direction, holes 12 for engaging with a drive wheel are provided at a approximately central portion 11 in a width direction and at predetermined intervals in a circumferential direction of the crawler body, the holes 12 being formed by a sprocket wheel between the metal cores 30, and lugs 15 and concave portion 27 are alternatively formed in unity in the circumferential direction.

As shown in FIGS. 1 and 3, each of the metal cores 30 buried in the crawler body 10 is provided with a metal core body 31 which is buried in the crawler body 10 and extended in the width direction of the crawler body 10, and the metal core body 31 has a central portion 32 engaging with a drive wheel and right and left blade portions 33 which are each protruded in the width direction from both ends of the central portion 32 to gradually reduce in the thickness with moving to the tip.

A pair of guide protrusions 34 protruded in the inner periphery side on the both sides across the central portion 32 of the metal core body 31 are provided in a protruding condition. A top surface 34a of each of the guide protrusions 34 corresponds to a passing (transit) side of a track roller. The track roller 40 is indicated by a virtual line in FIG. 3.

Lugs 15 provided on an outer periphery side of the crawler body 10 are divided into left and right sides after removal of the central portion on which holes 12 for engaging with a drive wheel are arranged, and the lugs 15 provided on left and right sides are arranged in zigzag alignment with shifting phase (phase shift) in a circumferential direction of the crawler body 10.

Each of the lugs 15 is inclined in the circumferential direction with respect to the width direction from a position adjacent to the central portion 11 and extended to a side end 10a, which forms an approximately trapezoidal shape in cross section.

Each of the lugs 13 is composed of a central side inclined surface 16, an edge side inclined surface 17, a front side inclined surface 18, a rear side inclined surface 19 and an contact area 20 corresponding to a tread, and formed in the form of an approximately trapezoidal shape in cross section. The central side inclined surface 16 is connected to a central portion 11 and extended continuously in the circumferential direction. The edge side inclined surface 17 is shifted in the circumferential direction with respect to the central side inclined surface 16 (concretely shifted backward in grounding condition) and extended in the circumferential direction with connected to the side end 10a of the crawler body 10. The front side inclined surface 18 is composed of a front inner side inclined surface 18a which is extended in the width direction from a forward end of the central side inclined surface 16, a front intermediate inclined surface 18b which is extended with being bent at the end of the width direction of the front inner side inclined surface 18a and inclined backward with respect to the circumferential direction, and a front outer side inclined surface 18c which is bent at the end in the width direction of the front intermediate inclined surface 18b and extended in the approximate width direction to be continuously connected to a forward end of the edge side inclined surface 17. The rear side inclined surface 19 is inclined in the circumferential direction from a rear end of the central side inclined surface 16 and continuously connected to a rear end of the edge side inclined surface 17. Thereby, the front intermediate inclined surface 18b and the front outer side inclined surface 18c of the front side inclined surface 18 form a concave face 18A which is concave in the direction of the rear side inclined surface 19 at the central portion of the front side inclined surface 18. In FIG. 1, the contact area 20 of each of the lugs 15 has been hatched.

In a central side edge 21 of the contact area 20 of each of the lugs 15, a central side front edge 21a and a central side rear edge 21b, which correspond to a front edge and a rear edge of the central side edge 21 formed along the edge of the central side inclined surface 16, respectively, are continuously connected to the front inner side inclined surface 18a and the rear side inclined surface 19, respectively, and an outer side front edge 22a and an outer side rear edge 22b, which correspond to a front edge and a rear edge of an outer side edge 22 of the contact area 20 formed by moving the outer side edge 22 along the edge side inclined surface 17, respectively, are continuously connected to the front outer side inclined surface 18c and the rear side inclined surface 19, respectively. A front side edge 23 of the contact area 20 is formed from a front central side edge 23a and a front outer side edge 23b. The front central side edge 23a is formed by continuously extending from the central side front edge 21a to a front central edge 23c along the edge side of the front inner side inclined surface 18a and front intermediate inclined surface 18b with bent at the front intermediate inclined surface 18b and front outer side inclined surface 18c. The front outer side edge 23b is formed by continuously extending from the front central edge 23c and the outer side front edge 22a along the edge side of the front outer side inclined surface 18c. Thus, the front side edge 23 is formed from the front central side edge 23a and the front outer side edge 23b with bent at the front central edge 23c. Further, a rear side edge 24 is formed along the edge side of the rear side inclined surface 19, and both ends of the rear side edge 24 are connected to the central side rear edge 21b and the outer side rear edge 22b, respectively.

Here, a distance of the central side front edge 21a and the central side rear edge 21b is represented by "La", the distance corresponding to a length in the circumferential direction on the central side of the contact area 20, a distance of the outer side front edge 22a and the outer side rear edge 22b is represented by "Lb", the distance corresponding to a length in the circumferential direction on the side edge side, and a distance of the front central edge 23c and the rear side edge 24c corresponding to a center in the width direction of the rear side edge 24 is represented by "Lc", the distance corresponding to a length in the circumferential direction at a center in the width direction. These distances are configured to satisfy any of the following conditions:

La>Lb>Lc  (a)

Lb>La>Lc  (b)

$La=Lb>Lc$  (c)

In more detail, in each of the lugs 15, the concave face 18A, which is formed from the front intermediate inclined surface 18b and the front outer side inclined surface 18c and which is concave in the direction of the rear side inclined surface 19, is formed on the central portion of the front side inclined surface 18, and the length "Lc" in the circumferential direction at the central portion in the width direction of the contact area 20 is reduced compared with the length "La" in the circumferential direction on the central side and the length "Lb" in the circumferential direction at the edge side, whereby a constriction portion 26 which is formed on the central portion in the width direction and whose section area is reduced in the circumferential direction is formed. Hence, bending stiffness in the central portion in the width direction provided with the constriction portion 26 is set to be low.

Each of the lugs 15 has such size (dimension) that is present astride three adjacent metal cores 30 in the circumferential direction in planar view, as shown in FIG. 1. In this embodiment, the central side front edge 21a of the contact area 20 and the front central edge 23c of the constriction portion 26 are arranged astride two metal cores 30 adjacent back and forth, the front central edge 23c of the constriction portion 26 and the outer side rear edge 22b are arranged astride metal cores 30 adjacent back and forth, and the outer side edge 22 has such a size in the width direction that covers at least a part of a tip of the blade portion 33 of the core metal 30. Further, a part of each of core metals 30 located at the midpoint of these core metals 30 are covered with the constriction portion 26.

Between the adjacent lugs 15, a concave portion 27 which extends from a central portion 11 to a side end 10a is formed from the rear side inclined surface 19 and the front side inclined surface 18 as well as a bottom portion 28 therebetween. The concave portion 27 between the adjacent lugs 15 is formed in a tapered shape such that an area between the front inner side inclined surface 18a and the rear side inclined surface 19 is gradually reduced in section area with moving from the central portion 11 to the side end 10a, and an area between the rear side inclined surface 19 and the front intermediate inclined surface 18b connecting to the previous area between 18a and 19 is formed in a tapered shape such that the area between 19 and 18b is gradually increased in section area from a narrow portion 100 to a central portion of the lug 15 with moving to the side end 10a, and further an area between the rear side inclined surface 19 and the front outer side inclined surface 18c is reduced in section view from the central portion of the lug 15 with moving to the side end 10a, and simultaneously the front outer side inclined surface 18c is extended and inclined approximately in width direction with an angle between the front outer side inclined surface 18c and the contact area 20 being set to be relatively increased.

In the rubber crawler 1 having the above-mentioned structure, the contact area 20 of the lug 15 continuously connects to ground in this order from the side of the central side front edge 21a to the side of the outer side rear edge 22b in forward travel, and simultaneously the central side front edge 21a of the next lug 15 adjacent to the previous lug 15 connects to ground in the course of the connecting of the contact area 20 of the lug 15.

In this way, the contact areas of the lugs 15 always and continuously connect to ground in seamless manners, and therefore the variation of vertical spring characteristics in the circumferential direction of the crawler body 10 is extremely reduced, which enhances bearing power of the core metals 30 of the crawler body 10 to suppress the vibration of the core metals 30.

Further, the lugs 15 ensure force supporting (bearing) each of the core metals 30 to suppress or reduce the vibration of each of the core metals 30, which prevents peeling and cracking of the core metals 30 from the crawler body 10. Furthermore, the contact area of each of the lugs 15 is supported by three adjacent core metals 30 and the end (tip) of the core metal 30 is reached to the outer side end 22 of the contact area 20, whereby the lug is widely supported by the three core metals 30 to enhance the supporting (bearing) stiffness of the lug, which suppresses the deformation of the lug 15 to reduce the damage and abrasion to bring about enhancement of the durability of the crawler body 10.

Further, since the contact area 20 of each of the lugs 15 is provided astride the blade portions 33 of three core metals 30, the power supporting the core metals 30 by the lugs 15 is more highly ensured to suppress the vibration of the core metals 30, thus extremely reducing the decline amount of the track roller 40, which means the declining extent of the track roller 40 between the metal cores 30 generated when the track roll 40 passes through the top surface 34a of the guide protrusion 34. Furthermore the vibration during the running of the rubber crawler is greatly reduced by arranging the lugs 15 in left and right sides in zigzag alignment. The reduction of the vibration during the running of the rubber crawler brings about prevention of occurrence of peeling of the crawler body 10 from the metal cores 30 or crack of the crawler body 10, and the lugs 15 are supported by the metal cores 30, which reduces the load of the lugs 15 to suppress breakage or abrasion of the lugs 15.

Moreover, the constriction portion 26 is formed on the central portion in the width direction of the lug 15 to set the bending stiffness on the central portion in the width direction of the lug 15 to be low, whereby the bending deformation of the lug 15 is tolerated. Therefore, the stiffness of the crawler body 10 is reduced throughout the whole circumference, whereby the crawler body 10 can be smoothly rounded (bent) around drive wheels, and hence running resistance is reduced and loss of power is greatly reduced to enable enhancement of travelling performance and fuel coast (mileage).

The formation of the constriction portion 26 on the central portion in the width direction of the lug 15 ensures sufficient distance between the front side inclined surface 18 and the rear side inclined surface 19 of the lug 15 to form the concave portion 27 in an increased size. Therefore, during vehicle running, the contact surface 20 of each of the lugs 15 continuously connects to grand from the central side front edge 21a to the outer side rear edge 22b to reduce the vibration, and hence mud grasped by the concave portion 27 of the lug 15 is not destroyed due to the reduction of the vibration and mud grasped between the deformed lugs 15 is also is not destroyed, the deformed lugs 15 being enhanced in compressive strength by loads added by the grounding (connecting to ground) and the plural core metals 30, whereby the mud is retained under pressure by the concave portion 27 and between the lugs 15 to bring about enhancement of soil-grasping property, and further shear force and frictional force between this retained mud and the ground are sufficiently ensured to bring about enhancement of straight-ahead driving property.

Further, in the concave portion 27 between the lugs 15, the area between the rear side inclined surface 19 and the front inner side inclined surface 18a of the adjacent lugs 15 is formed in a tapered shape such that the section area is gradually reduced with moving from the central portion 11 side to the side end 10a side, whereby entering of mud from the central portion 11 is promoted, and continuously the mud in the range is aggressively guided to the side end 10a by means of a tapered shape formed by gradually increasing the section area of the range between the rear side inclined surface 19 and the front intermediate inclined surface 18b with moving to the side end 10a. Furthermore, the range between the rear side inclined surface 19 and the front outer side inclined surface 18c is gradually reduced in section area with moving to the side end 10a, and simultaneously an angle between the front outer side inclined surface 18c and the outer side contact area 23 is relatively increased with the front outer side inclined surface 18c being extended and inclined approximately in the width direction. Therefore, mud introduced (guided) from the central side portion 11 of the concave portion 27 acts as pressing force in the downward and circumference directions by means of the front outer side inclined surface 18c, whereby excellent soil-discharging property can be obtained.

(Second Embodiment)

Figure 5:
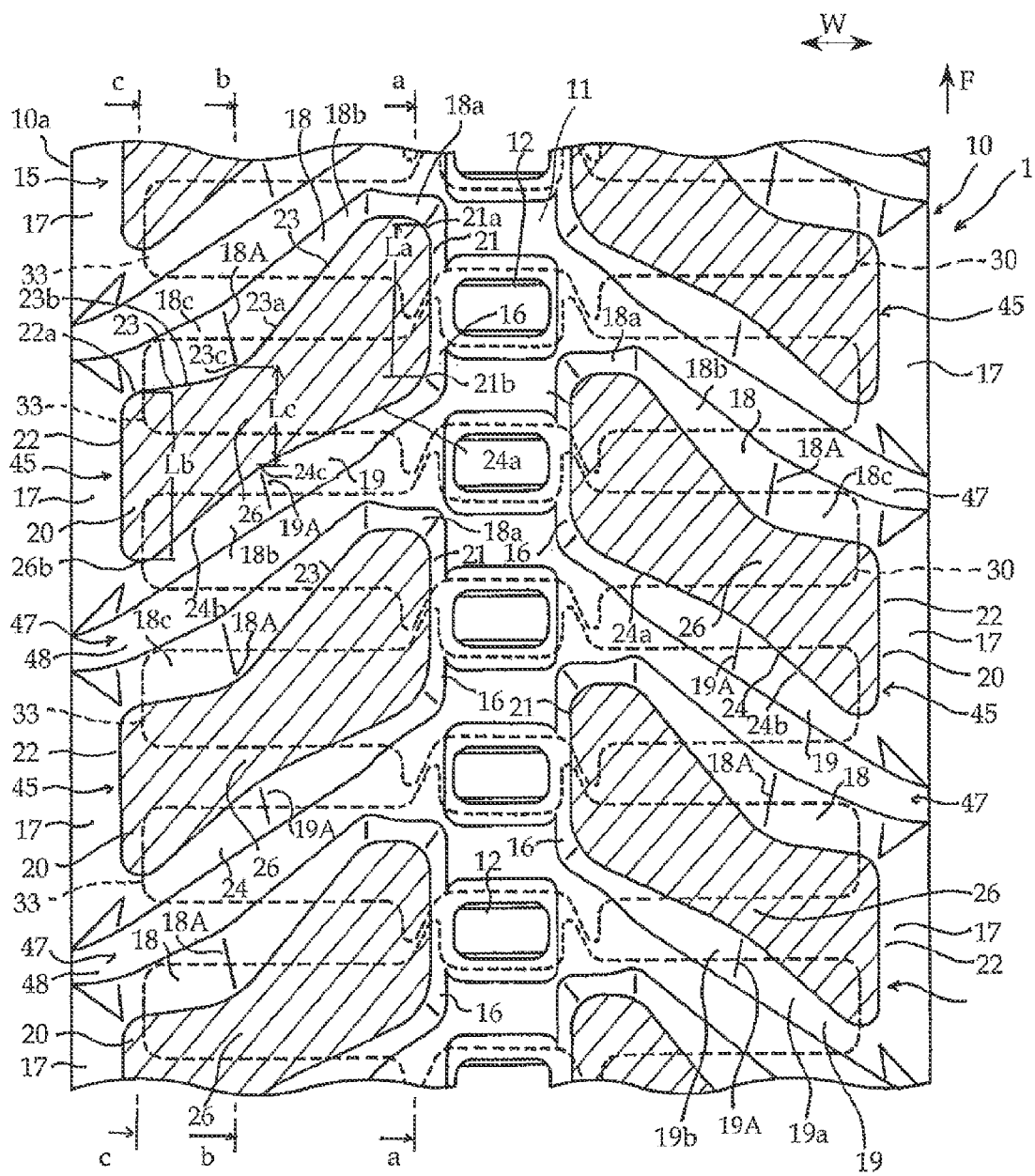
FIG. 5 is a plan view showing a major part of the rubber crawler according to a second embodiment of the present invention viewed from an outer periphery side of the rubber crawler.
Figure 6:
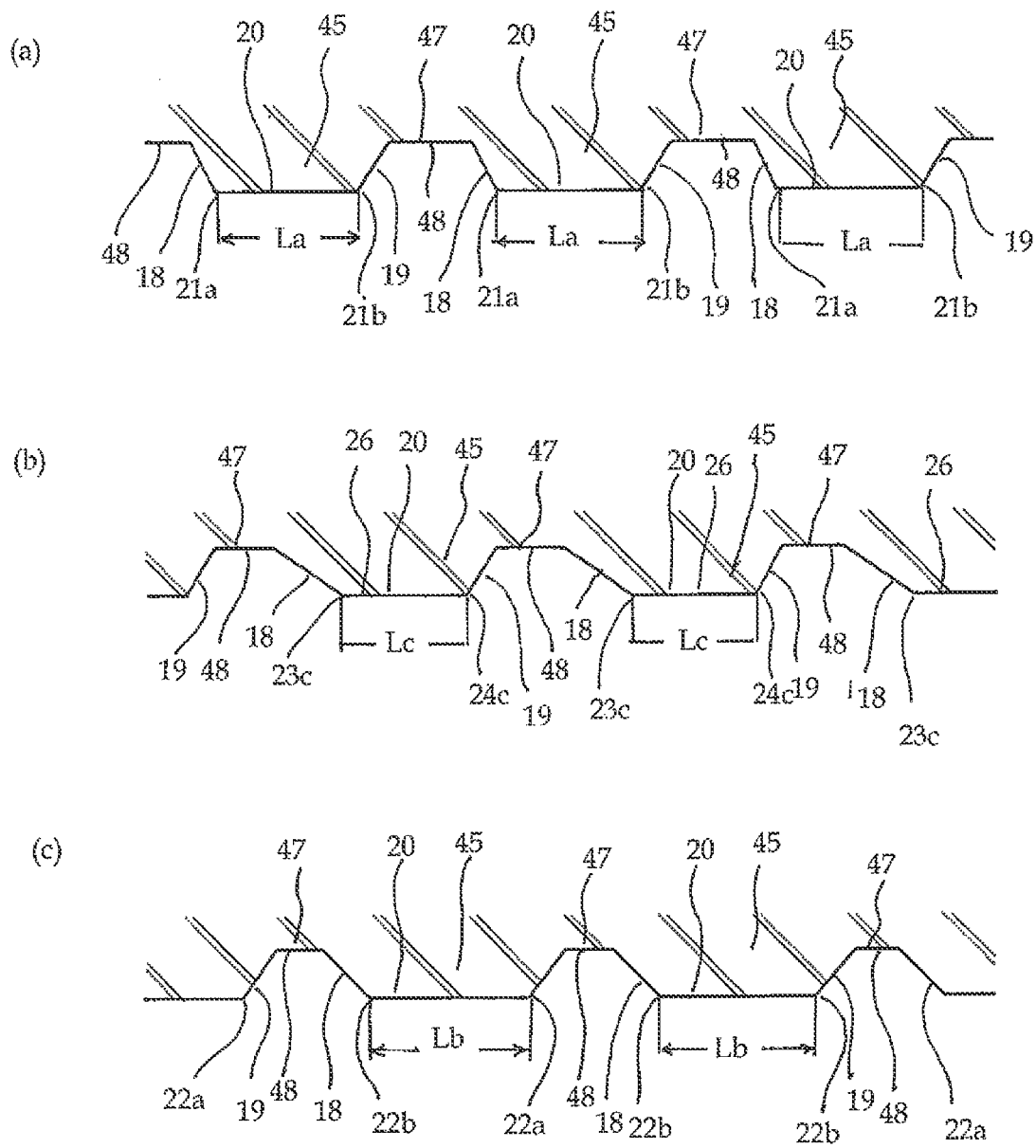
FIG. 6(a) is a section view of FIG. 5 taken at the section line a-a, FIG. 6(b) a section view of FIG. 5 taken at the section line b-b, and FIG. 6(c) a section view of FIG. 5 taken at the section line c-c.
Figure 7:
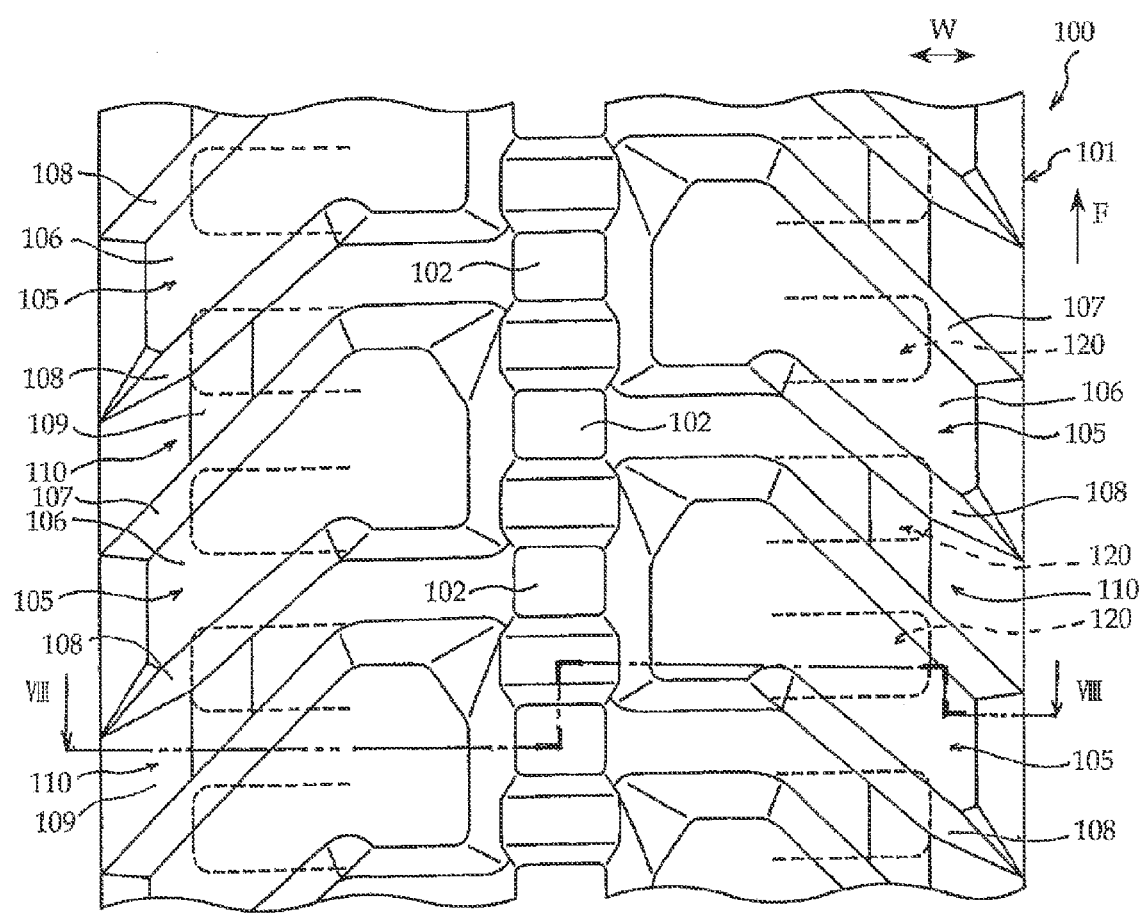
FIG. 7 is a plan view showing a major part of a conventional rubber crawler viewed from the outer periphery side of the rubber crawler.
Figure 8:
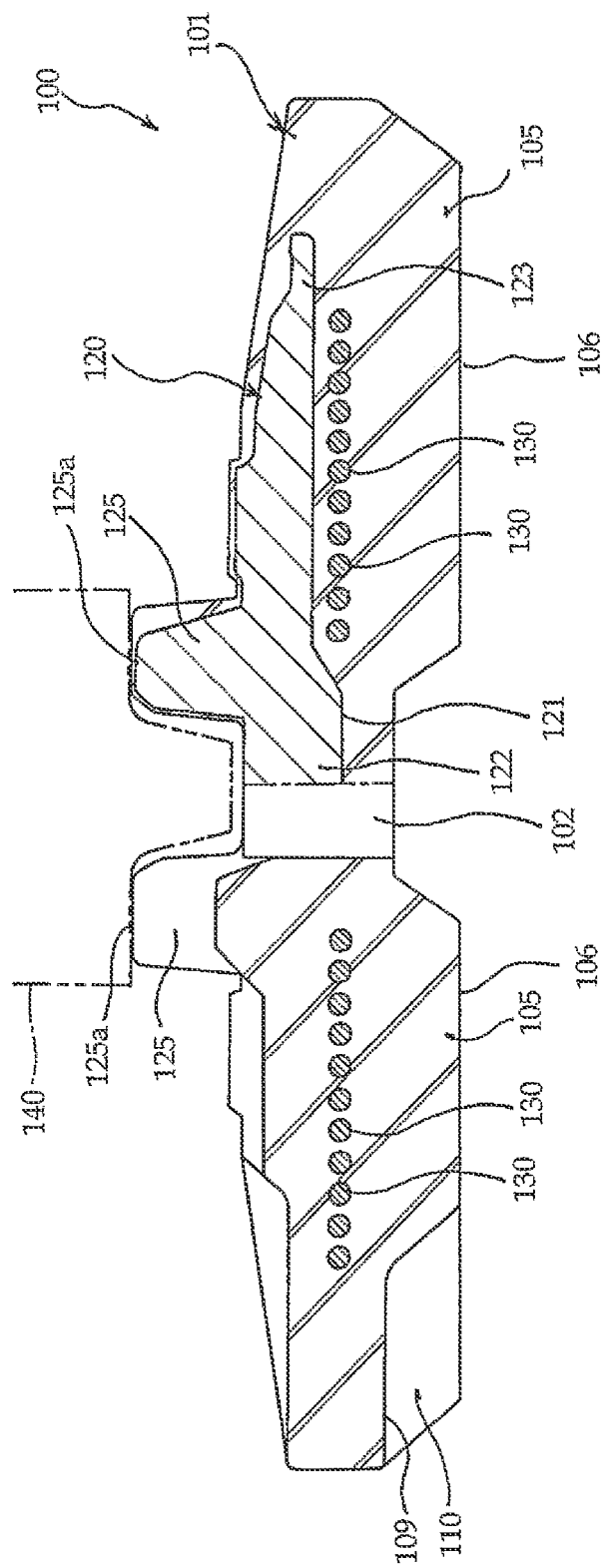
FIG. 8 is a section view of FIG. 7 taken at the section line VIII-VIII.

A second embodiment of the rubber crawler is explained below with reference to FIGS. 5 and 6. FIG. 5 is a plan view showing a major part of the rubber crawler, and FIG. 6(a) is a section view of FIG. 5 taken at the section line a-a, FIG. 6(b) a section view of FIG. 5 at the section line b-b, and FIG. 6(c) a section view of FIG. 5 at the section line c-c. In FIGS. 5 and 6, the parts corresponding to those of FIGS. 1 to 4 are numbered according to the reference numbers of FIGS. 1 to 4, and the detailed explanation regarding the parts is omitted. Hence, only the parts different from the first embodiment are explained chiefly.

In a rubber crawler 1, a plurality of metal cores 30 are buried in an endless band-shaped crawler body 10 comprising an elastic material at predetermined intervals in a circumferential direction of the crawler body, each of the metal cores 30 extending in a width direction of the crawler body, a plurality of circumferential-direction tensile bodies 36 in the outer periphery side of metal cores 30 are buried in the circumferential direction, holes 12 for engaging with a drive wheel are provided on an approximately central portion 11 in a width direction and at predetermined intervals in a circumferential direction of the crawler body, the drive wheel being formed by a sprocket wheel between the metal cores 30, and lugs 45 and concave portion 47 are alternatively formed in unity in the circumferential direction, in the same manner as the above-mentioned first embodiment.

Lugs 45 provided on an outer periphery side of the crawler body 10 are divided into left and right sides after removal of the central portion on which holes 12 for engaging with a drive wheel are arranged, and the lugs (opposite lugs) 15 divided into left and right sides are arranged in zigzag alignment with shifting phase (phase shift) in a circumferential direction of the crawler body 10.

Each of the lugs 45 is inclined in the circumferential direction with respect to the width direction from a position adjacent to the central portion 11 and extended to a side end 10a, which forms an approximate trapezoidal shape in cross section. Each of the lugs 45 is composed of a central side inclined surface 16, an edge side inclined surface 17, a front side inclined surface 18, a rear side inclined surface 19 and an contact area 20 corresponding to a tread, and formed in the form of an approximately trapezoidal shape in cross section. The central side inclined surface 16 is extended continuously in the circumferential direction along the central portion 11. The edge side inclined surface 17 is extended in the circumferential direction along the side end 10a of the crawler body 10 with shifted in the circumferential direction with respect to the central side inclined surface 16. The front side inclined surface 18 is composed of a front inner side inclined surface 18a which is extended in the width direction from a forward end of the central side inclined surface 16, a front intermediate inclined surface 18b which is extended with being inclined backward with respect to the circumferential direction from the width direction end of the front inner side inclined surface 18a, and a front outer side inclined surface 18c which is extended in the approximate width direction from the width direction end of the front intermediate inclined surface 18b and continuously connected to a forward end of the edge side inclined surface 17. The rear side inclined surface 19 is composed of a rear inner side inclined surface 19a which is extended with inclined backward in the width direction from the back end of the central side inclined surface 16 and a rear outer side inclined surface 19b which is extended from the end in the width direction of the rear inner side inclined surface 19a to the rear end of the edge side inclined surface 17 with inclined backward at smaller angle in the circumferential direction than that of the rear inner side inclined surface 19a.

Thereby, the front intermediate inclined surface 18b and the front outer side inclined surface 18c of the front side inclined surface 18 form a concave face 18A which is concave in the direction of the rear side inclined surface 19 on the central portion of the front side inclined surface 18. Similarly, the rear inner side inclined surface 19a and the rear outer side inclined surface 19b of the rear side inclined surface 19 form a concave face 19A which is concave in the direction of the front side inclined surface 18 on the central portion in the width direction of the rear side inclined surface 19. In FIG. 5, the contact area 20 of each of the lugs 45 has been hatched.

A central side front edge 21a and a central side rear edge 21b, which correspond to a front edge and a rear edge of the central side edge 21 of the contact area 20 of the lug 45, respectively, are continuously connected to the front inner side inclined surface 18a and the rear side inclined surface 19, respectively, and an outer side front edge 22a and an outer side rear edge 22b, which correspond to a front edge and a rear edge of an outer side edge 22, respectively, are continuously connected to the front outer side inclined surface 18c and the rear side inclined surface 19, respectively. A front side edge 23 of the contact area 20 is formed from a front central side edge 23a and a front outer central side edge 23b. The front central side edge 23a is formed by continuously extending from the central side front edge 21a to a front central edge 23c corresponding to the connecting part of the front intermediate inclined surface 18b and front outer side inclined surface 18c along the front inner side inclined surface 18a and front intermediate inclined surface 18b. The front outer central side edge 23b is formed by continuously extending from the front central edge 23c and the outer side front edge 22a along the edge side of the front outer side inclined surface 18c. The rear side edge 24 is composed of the rear inner side edge 24a and the rear outer side edge 24b which are extended along the rear inner side inclined surface 19a and the rear outer side inclined surface 19b and bent at the rear side central edge 24c to be extended.

Here, a distance of the central side front edge 21a and the central side rear edge 21b is represented by "La", the distance corresponding to a length in the circumferential direction on the central side of the contact area 20, a distance of the outer side front edge 22a and the outer side rear edge 22b is represented by "Lb", the distance corresponding to a length in the circumferential direction on the side edge side, and a distance of the front central edge 23c and the rear side edge 24c is represented by "Lc", the distance corresponding to a length in the circumferential direction at a center in the width direction. These distances are configured to satisfy any of the following conditions:

$$La > Lb > Lc \quad (a)$$

$$Lb > La > Lc \quad (b)$$

$$La = Lb > Lc \quad (c)$$

In more detail, in each of the lugs 45, the concave face 18A, which is concave in the direction of the rear side inclined surface 19 and which is formed from the front intermediate inclined surface 18b and the front outer side inclined surface 18c, is formed at the central portion of the front side inclined surface 18, and the concave face 19A, which is concave in the direction of the front side inclined surface 18 and which is formed from the rear inner side inclined surface 19a and the rear outer side inclined surface 19c, is formed on the rear side inclined surface 19, and further the length "Lc" in the circumferential direction on the central portion in the width direction of the contact area 20 is reduced compared with the length "La" in the circumferential direction on the central side and the length "Lb" in the circumferential direction on the edge side, whereby a constriction portion 26 which is formed on the central portion in the width direction and whose section area is reduced in the circumferential direction is formed. Hence, bending stiffness in the central portion in the width direction provided with the constriction portion 26 is set to be low.

Each of the lugs 45 has such size (dimension) that is present astride three adjacent metal cores 30 in the circumferential direction in planar view, as shown in FIG. 5. In this embodiment, the central side front edge 21a of the contact area 20 and the front central edge 23c of the constriction portion 26 are arranged astride two metal cores 30 adjacent back and forth, the front central edge 23c of the constriction portion 26 and the outer side rear edge 22b are arranged astride metal cores 30 adjacent back and forth, and the outer side edge 22 has such a size in the width direction that covers at least a part of a tip of the blade portion 33 of the core metal 30. Further, a part of each of core metals 30 located at the midpoint of these core metals 30 are covered with the constriction portion 26.

Between the adjacent lugs 45, a concave portion 47 which extends from a central portion 11 to a side end 10a is formed from the rear side inclined surface 19 and the front side inclined surface 18 as well as a bottom portion 28 therebetween.

The concave portion 47 between the adjacent lugs 45 is formed in a tapered shape such that an area between the front inner side inclined surface 18a and the rear inner side inclined surface 19a is gradually reduced in section area with moving from the central portion 11 to the side end 10a, and an area between the rear inner side inclined surface 19a and the front intermediate inclined surface 18b connecting to the previous area between 18a and 19a is formed in a tapered shape such that the area between 19a and 18b is gradually increased in section area with moving from the central portion 11 to the side end 10a, and further an area between the rear outer side inclined surface 19b and the front outer side inclined surface 18c is reduced in section view with moving to the side end 10a, and simultaneously the front outer side inclined surface 18c is extended and inclined approximately in width direction with an angle between the front outer side inclined surface 18c and the contact area 20 being set to be relatively increased.

In the rubber crawler 1 having the above-mentioned structure, the contact area 20 of the lug 45 continuously connects to ground in the order of from the central side front edge 21a to the outer side rear edge 22b in forward travel, and simultaneously the central side front edge 21a of the next lug 45 adjacent to the previous lug 45 connects to ground in the course of the connecting to ground of the contact area 20 of the lug 45.

In this way, the contact areas 20 of the lugs 45 always and continuously connect to ground in seamless manners, and therefore the variation of vertical spring characteristics in the circumferential direction of the crawler body 10 is extremely reduced, which enhances bearing power of the core metals 30 of the crawler body 10 to suppress the vibration of the core metals 30. The reduction of the vibration of the core metals 30 brings about the prevention of peeling of the crawler body 10 from the core metals 30 or of cracking of the crawler body 10. Further, the contact area of each of the lugs 45 is supported by three adjacent core metals 30 and the end (tip) of the core metal 30 is reached to the outer side end 22 of the contact area 20, whereby the lug is widely supported by the three core metals 30 and the supporting (bearing) stiffness of the lug 45 is enhanced, which suppresses the deformation of the lug 45 to reduce the damage and abrasion to bring about enhancement of the durability of the crawler body 10.

Further, since the contact area 20 of each of the lugs 45 is provided astride the blade portions 33 of three core metals 30, the power supporting the core metal 30 by the lug 15 is more highly ensured to suppress the vibration of the core metal 30, thus extremely reducing the decline amount of the track roller 40, which means the declining extent of the track roller 40 between the metal cores 30 generated when the track roll 40 passes through the top surface 34*a* of the guide protrusion 34. Furthermore the vibration during the running of the rubber crawler is greatly reduced by arranging the lugs 45 in left and right sides in zigzag alignment. The reduction of the vibration during the running of the rubber crawler brings about prevention of occurrence of peeling of the crawler body 10 from the metal cores 30 or crack of the crawler body 10, and the lugs 45 are supported by the metal cores 30, which reduces the load of the lugs to suppress breakage or abrasion of the lugs 45.

Moreover, the constriction portion 26 is formed on the central portion in the width direction of the lug 45 to set the bending stiffness at the central portion in the width direction of the lug 45 to be low, and therefore, the stiffness of the crawler body 10 is reduced throughout the whole circumference, whereby the crawler body 10 can be smoothly rounded (bent) around drive wheels, and hence running resistance is reduced and loss of power is greatly reduced to enable enhancement of travelling performance and fuel coast (mileage).

During vehicle running, the contact surface 20 of the lug 15 continuously connects to grand from the central side front edge 21*a* to the outer side rear edge 22*b* to reduce the vibration, and hence mud grasped by the concave portion 47 of the lug 45 is not destroyed due to the reduction of the vibration, whereby force effectively used as traction force can be ensured. Further, mud grasped by the lugs 45 on the central side which is enhanced in compressive strength by loads added by the grounding (connecting to ground) and the plural core metals 30, is retained under pressure without being destroyed, which brings about enhancement of soil-grasping property, and further shear force and frictional force between this retained mud and the ground are sufficiently ensured to bring about enhancement of straight-ahead driving property.

Embodiments according to the present invention can be modified without being restricted to the above-mentioned embodiments so long as the modification does not deviate from the gist of the invention. The first embodiment describes an example that the concave face 18A is formed on the front side inclined surface 18 of the lug 15, and the second embodiment describes an example that the concave faces 18A and 19A are formed on the front side inclined surface 18 and the rear side inclined surface 19 of the lug 45, respectively. However, for example, the concave portion may not be formed on the front side inclined surface 18 but formed on only the rear side inclined surface 19.

EXPLANATION OF REFERENCE NUMBER

1 Rubber crawler
10 Crawler body
10*a* Side end
11 Central portion
12 Hole(s) for engaging
15 Lug(s)
16 Central side inclined portion
17 Edge side inclined portion
18 Front side inclined portion
18A Concave face
19 Rear side inclined portion
20 Contact surface
26 Constriction portion
27 Concave portion
30 Metal core(s)
45 Lug(s)
48 Concave portion

What is claimed is:

1. A rubber crawler comprising;
   an endless band-shaped crawler body comprising an elastic material,
   a plurality of metal cores buried in the crawler body at predetermined intervals in a circumferential direction of the crawler body, each of the metal cores extending in a width direction of the crawler body,
   holes for engaging with a drive wheel provided at a central portion in the width direction of the crawler body and at predetermined intervals in the circumferential direction of the crawler body, and
   lugs provided on an outer periphery side of the crawler body, the lugs being divided into left and right sides across the central portion in the width direction, and the lugs divided into left and right sides being arranged in zigzag alignment with phase shift in the circumferential direction of the crawler body,
   wherein each of the lugs is in the shape of a trapezoid in section view having a contact area, a front side inclined surface and a rear side inclined surface, and extends from the central portion with inclining in the circumferential direction with respect to the width direction, and
   each of the lugs is arranged astride three adjacent metal cores in the circumferential direction in planar view, and simultaneously has a constriction portion narrowing in the circumferential direction which is provided at a central portion of the lug in the width direction;
   wherein, for each of the lugs, a bottom portion is formed between the front side inclined surface of the lug and the rear side inclined surface of an adjacent lug, the bottom portion being formed such that a length of the bottom portion in the circumferential direction is increased from a narrow part of the bottom portion at a portion of the lug, which is between the central portion of the lug and the central portion of the crawler body, to the central portion of the lug and is reduced from the central portion of the lug to the outer side end of the lug.

2. The rubber crawler as defined in claim 1, wherein the constriction portion is formed such that a length in the circumferential direction at the central portion of the lug in the width direction of the contact area of each of the lugs is smaller than that in the circumferential direction at a central side of the contact area and that in the circumferential direction at an edge side of the contact area.

3. The rubber crawler as defined in claim 1, wherein the constriction portion is formed by a concave face formed at the central portion of the lug in the width direction of the front side inclined surface of each of the lugs.

4. The rubber crawler as defined in claim 1, wherein the constriction portion is formed by a concave face formed at the central portion of the lug in the width direction of the front side inclined surface of each of the lugs and a concave face formed at the central portion of the lug in the width direction of the rear side inclined surface of each of the lugs.

5. The rubber crawler as defined in claim 1, wherein the constriction portion is formed by a concave face formed at the central portion of the lug in the width direction of the rear side inclined surface of each of the lugs.

6. The rubber crawler as defined in claim 1, wherein each of the lugs covers at least a part of a tip of one of the metal cores in planar view.

7. The rubber crawler as defined in claim 1, wherein an angle between the front side inclined surface and an outer surface of the contact area at the center portion of the lug is larger than an angle between the front side inclined surface and the outer surface of the contact area at an outer edge portion of the lug.

8. The rubber crawler as defined in claim 7, wherein an angle between the rear side inclined surface and the outer surface of the contact area at the center portion of the lug is larger than an angle between the rear side inclined surface and the outer surface of the contact area at the outer edge portion of the lug.

9. The rubber crawler as defined in claim 1, wherein an angle between the rear side inclined surface and the outer surface of the contact area at the center portion of the lug is larger than an angle between the rear side inclined surface and the outer surface of the contact area at an outer edge portion of the lug.

10. The rubber crawler as defined in claim 1, wherein the front side inclined surface from the center portion of the lug to an outer edge portion of the lug extends in substantially the width direction.

\* \* \* \* \*